United States Patent Office 3,825,445
Patented July 23, 1974

3,825,445
ELECTROCHEMICAL CELL WITH CATALYZED
ACID PEROXIDE ELECTROLYTE
Richard W. MacCarthy, 35 Union Ave., Apt. 25,
Campbell, Calif. 95008
No Drawing. Filed Mar. 19, 1973, Ser. No. 342,867
Int. Cl. H01m 27/00
U.S. Cl. 136—83 R                                    14 Claims

ABSTRACT OF THE DISCLOSURE

A high energy density electrochemical cell or fuel cell having an anode containing lithium, calcium magnesium, zinc, or aluminum with an acid electrolytic fuel containing a peroxide catalyzed by a salt of one or more metals selected from iron, cobalt, nickel, and copper. The rate of reaction may be moderated by concentration of salts of one or more metals high in the electromotive series or by a primary alcohol. A preferred cell comprises a carbon cathode, a magnesium anode, and an aqueous electrolyte containing, in moles per liter, about 4 hydrochloric acid, 0.6 hydrogen peroxide, 1.2 magnesium chloride, 0.02 ferric chloride, and 0.02 cupric chloride.

BACKGROUND OF THE INVENTION

This invention relates to primary or nonreversible electrochemical cells and particularly to primary fuel cells or reserve cells in which metals of high electrochemical potential are consumed at a rate determined by their exposure to aqueous electrolytic fuel.

The emphasis underlying inventive activity relating to batteries and fuel cells is increasingly being directed toward electrochemical systems compatible with the critical energy economy of the world.

It is becoming clear that storage batteries cannot be the general solution to the automotive energy problem because of their demand on already critical retail electric power for recharging. Fuel cells fed by fossil fuels have the similar disadvantage of depleting critical supplies. A "hydrogen economy" has been proposed to provide a versatile fuel which can be recycled from non-fossil sources and readily distributed from electrolyzer plants situated where energy is plentiful. But hydrogen is bulky and dangerous for automotive use. The plentiful metals in seawater, namely sodium, magnesium, and calcium are also readily obtainable by electrolysis and possibly by direct thermal means deriving from solar energy technology. These elements are far denser than hydrogen and especially in the case of calcium, magnesium and their olloys are safe and convenient for the average person to handle in fueling domestic fuel cells and automobiles.

However, the prior art shows few examples of primary cells that would be suitable for heavy-duty public utility, industrial, domestic or automotive use. The shortcomings of earlier cells have been primarily in their low power density and their incompatibility with automotive refueling cycle requirements.

In the prior art magnesium has seen restricted use in cells which generally employ means to avoid its vigorous reaction with the acidic aqueous electrolytes with which it should develop its highest power density. Calcium, although potentially cheaply available in unpurified form as a byproduct from sodium production, has been little exploited, even though its electrochemical ranking exceeds that of sodium. Calcium, although far safer than sodium, not only dissociates water but forms an insoluble hydroxide which is difficult to purge from an electric cell. Calcium chloride, magnesium chloride, and magnesium sulfate are soluble, but both metals react violently with uninhibited mineral acids evolving hydrogen gas wastefully and dangerously.

REVIEW OF THE PRIOR ART

Pat. No. 3,019,279 describes a magnesium primary cell continuously depolarized by the chlorination of recirculating brine electrolyte fed through a porous carbon cathode. Examples show that batteries of such cells would be suitable for large substation-size installations at about 6 pounds system weight per kilowatt hour. Pat. No. 3,134,-698 describes a similar system utilizing bromine instead of chlorine.

Lucas, in U.S. Pat. No. 2,706,213 (Apr. 12, 1955) described the use of 30% hydrogen peroxide in a solution of magnesium chloride as the electrolyte of a cell having a magnesium or aluminum anode and a carbon or copper cathode. Although the pH value of this electrolyte is not explicitly stated, the reaction is constrained to the oxidation of the anode by the hydrogen peroxide to produce the hydroxide of the anode metal. With magnesium anodes, rustless steel or silver are preferred cathode materials, whereas with aluminum anodes, cathodes are made from carbon or copper. It is stated that the hydroxides of iron or copper may be precipitated with the anodic metal hydroxide when those materials are present. It is stated that the magnesium hydroxide precipitate may be removed from the electrolyte effluent to facilitate the recirculation of the electrolyte. Removal of the hydroxide may be effected either by filtration or by the addition of 10% by volume of hydrochloric acid, but the reaction of the acid with the anode metal is explicitly suppressed in favor of the oxidation of the anode by hydrogen peroxide. The low hydrogen ion concentration of the electrolyte would not favor the solution of copper or iron chlorides found advantageous in the present invention if either of these metals were present. Of significance to the present invention is the observation that the hydrogen peroxide is functioning as much more than a depolarizer. However, the requirement in the Lucas patent for 15 to 18 cc. of 30% hydrogen peroxide per watt-hour and the power density of only about 0.026 w./cm.$^2$ do not provide a cell meeting the economic or density objects of the present invention. Furthermore, the tendency of concentrated hydrogen peroxide to passivate magnesium and the relative instability of hydrogen peroxide in the relatively alkaline solution make it necessary for Lucas to feed the peroxide separately from the main electrolyte, imposing a further constraint on the use of the invention. The use of other peroxides or more reactive anode materials is not discussed in the Lucas patent.

In Pat. No. 3,330,701, McElhill and Gruber disclose a primary cell of dry cell construction having a cathode which includes a depolarizer consisting of an organic peroxide. Electronic contact between the anode metal and the cathode depolarizer is explicity excluded and is prevented by placing the electrolyte between the peroxide depolarizer and the anode. The function of the peroxide in this environment is clearly not the direct reaction with the active anode metal which Lucas described, nor is there a reaction of the peroxide with hydrogen released at the anode as in the present invention.

My copending application No. 321,768 describes a fuel cell for the reaction of alkali or alkaline earth metals with aqueous electrolytes. In this cell, aqueous fuel feed and exhaust ports are interposed at short intervals in the cathode, and a membrane separates the anode from the cathode. I disclosed the use of hydrogen peroxide in water as the hydrogen-oxidizing pre-electrolyte for a sodium cell, or hydrogen peroxide and hydrochloric acid for an alkaline earth or magnesium cell. I minimized the contact of oxidizing acid with the copper cathode by feeding the acid and the peroxide to the membrane from alternating holes in the cathode.

SUMMARY

In the present invention, prior art limitations with respect to electrolyte activity with the electropositive metals and the requirement for special membranes and electrolyte feeding techniques are avoided by the employment of inexpensive catalytic additives for acid peroxide electrolytes. It is found that salts of certain metals lower in the electromotive series than the anode metals promote the electrically productive reaction of hydrogen peroxide with the hydrogen released from acid electrolyte at the anode. The chlorides of copper and iron have been found outstandingly effective in a solution of hydrochloric acid and hydrogen peroxide in a cell with a magnesium anode and a carbon cathode. Power densities greater than 1.5 w./cm.$^2$ have been achieved with such a cell. Such power densities are especially desirable for automotive applications to supply the surges necessary for emergency acceleration. Electrically nonproductive reaction is minimized by the inclusion of a primary alcohol in the electrolyte or by providing a concentration of salts of one or more metals high in the electromotive series.

An object of this invention is to obtain a high electrical power density safely and economically from a cell utilizing abundant fuels of high electrochemical equivalent.

Another object of this invention is to provide a cell with a consumable anode made from a metal high in the electromotive series reacting with an aqueous acid electrolyte containing a hydrogen oxidizing agent.

Yet another object of this invention is to provide a cell having an acid brine electrolyte containing a peroxide together with an inexpensive catalyst which releases oxygen from the peroxide only subject to the main reaction of the anode and the acid, in order to combine the oxygen with the hydrogen displaced from the acid without rendering the electrolyte generally unstable.

Still a further object of this invention is to provide a cell in which an anode of a metal high in the electromotive series reacts with an electrolyte which may be inhibited by a primary alcohol to suppress nonproductive reactions.

Another object of this invention is to provide a fuel cell which requires no special membrane between the electrodes and in which the electrical efficiency is relatively independent of cell structure.

Other and further objects of this invention will be apparent to those skilled in the art to which it relates from the following specification, examples, and claims.

GENERAL STATEMENT RELATING TO THE INVENTION

If a piece of calcium or magnesium is dropped into a solution of hydrochloric acid, it reacts vigorously, with the rapid evolution of hydrogen gas. If the acid solution contains a high concentration of a chloride or a mixture of chlorides of sodium, calcium, or magnesium, the reaction takes place at a slower rate. If an anode of calcium or magnesium and a cathode of copper or carbon are dipped into the acid solution without prior addition of salt, voltage and current can be measured between electrodes, but much more energy appears in the form of heat and escaping hydrogen than in the form of electricity. The addition of the salt improves the electrical/heat ratio. This improvement appears to be the result of a shift in the ratio of the number of ions available as electrolytic carriers between the electrodes to the number of ions immediately available for hydrogen displacement by the anode metal.

Although increased salt concentration or the substitution of a primary alcohol for part of the water decreases the violence of the reaction, it does not improve the wasteful liberation of hydrogen from acid solutions by calcium or magnesium. This evolution of hydrogen by the anode reaction is not to be confused with cathode polarization, whereby hydrogen ions receive electrons from the cathode and accumulate there.

The anodic evolution of hydrogen is wasteful unless it can be converted into electrical energy. This might be done in a separate fuel cell, but it can be accomplished within the salt-moderated acid electrolyte if a peroxide is present in solution as in the present invention. Hydrogen peroxide is formed by the hydrolysis of various peroxides and peroxyacids and it is stable in acid solution. It is somewhat too stable to oxidize the nascent hydrogen as rapidly as the hydrogen is released at the anode. In the present invention, hydrogen peroxide appears to be catalytically decomposed precisely where monatomic oxygen is desired for reaction with the nascent, monatomic hydrogen by means of a metal of Group 8 or Subgroup 1 of the Periodic Table, such as iron, cobalt, nickel, or copper. A low concentration of any of these metal ions in the electrolyte of the present invention appears to be chemically reduced by the more electropositive metal of the anode to surround the anode with catalytic metal particles. If copper chloride is used as the catalyst with a magnesium anode, the anode will become coated with a porous mixture of free copper and other reaction products. Because copper is soluble in oxidizing acid solutions such as the hydrohloric acid-hydrogen peroxide typical of the present invention, any excess of reduced copper carried away from the anode by fluid motion is immediately redissolved and again available for reduction at the anode when carried thereby by circulation. If ferric chloride is added, copper does not actually deposit and efficiency is increased. Sulfuric acid is found to prevent the fouling of magnesium anodes. Chloride ion may then be introduced in the form of a halogen salt of an electropositive element, preferably from Group 1 or Group 2 of the Periodic Table, or as hydrochloric acid.

The reactions which appear to occur with a calcium anode and a copper chloride catalyst may be summarized in simplified form for purposes of illustration but not to limit the invention:

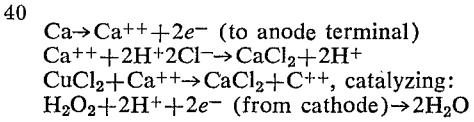

In my copending application No. 321,768, the electrochemistry of the present invention was closely approximated, because some reaction of the electrolyte and copper will occur, forming copper chloride, and a considerable concentration of the chloride of the anode metal will be built up in the membrane. However, there was no indication in the tests employing a membrane that the automatic reduction of catalytic copper or related metals by the anode in an acid brine could be employed in an open electrolyte to achieve an even higher energy density. The recognition and selective employment of this means of simplifying cell construction and improving performance constitutes the basis of the present invention.

The following examples are presented to illustrate and not in any way to limit the invention. All these examples were performed by immersion of the anode in a beaker of the electrolyte in proximity to a carbon cathode, which was slotted to react with both sides of the anode. Certain qualitative observations help to explain the effect of variations in the composition of the electrolyte:

Methanol ($CH_3OH$) is far more effective than ethanol ($C_2H_5OH$) in slowing the reaction of calcium, whereas the two alcohols are nearly equivalent in moderating the reaction with magnesium. Saturating the electrolyte with sodium chloride, calcium chloride, or magnesium chloride has much the same effect on magnesium reactions as the addition of alcohol. The formation of addition compounds between the alcohols and the anodic metals is discussed in numerous references. Typical of such compounds is $CaCl_2, 4CH_3OH$. There are analogous compounds of magnesium.

The primary alcohols tend to inhibit the catalytic decomposition of hydrogen peroxide by the heavy metals and can therefore serve a secondary function as stabilizers in the electrolyte. Alcohols and brines are also effective in lowering the freeezing point of the electrolyte.

Copper chloride is an effective catalyst with all the anode metals and electrolyte compositions included in the present invention. However, the metallic copper is reduced rapidly enough under some conditions to cause fouling, particularly if the electrodes are close together. Ferric chloride is at least as effective and shows less tendency to cause fouling. Nickel and cobalt chloride and other halides of the related metals were also effective but showed no special advantages. The optimum catalyst appeared to be a mixture of copper chloride and ferric chloride, reducing the quantity of each to a concentration of about 0.02 mole per liter, with no tendency to produce fouling.

Reactions with zinc were extremely quiet in all the examples, although the zinc was blackened in each case. Aluminum was highly erratic, giving negligible output until the iron, copper, or nickel chloride catalyst was added, but producing loose black coatings which detached and caused fouling with the copper and nickel catalysts. The ferric chloride catalyst produced a mild reaction with no fouling with aluminum anodes, justifying the inclusion of aluminum in the list of anode materials suitable for the present invention.

The presence of sulfuric acid in conjunction with chloride ions was found to be beneficial in cells of the present invention having magnesium anodes, minimizing their fouling by magnesium oxychloride.

Halogen salts are desirable but not indispensable in the practice of the invention, as a fairly high power density is obtainable from magnesium with an electrolyte initially containing only hydrogen peroxide, sulfuric acid, and copper sulfate.

with sufficient acidity and the presence of the heavy metal catalysts.

No precipitate was formed in any of the examples. Anodic coatings dissolved after turbulent detachment from the anodes.

Tests made during the optimization of the metal salt catalyst included molybdenum oxypentachloride and potassium chlorochromate. The molybdenum salt produced a slight increase in power density, as compared with uncatalyzed electrolyte, whereas that obtained from the chromium complex was negligible. Zinc chloride had no effect. The metals found to have superior catalytic action share the following properties: (1) They are not rapidly attacked by hydrochloric acid unless an oxidizer is present. (2) They are ionized in the presence of an acid and hydrogen peroxide. (Copper oxychloride, produced in a hydrochloric acid solution with an excess of hydrogen peroxide, is redissolved in hydrochloric acid during normal cell operation.) (3) Their salts in acid peroxide solution can be reduced by the alkaline earth metals and magnesium.

All the acid electrolytes listed in the examples were relatively stable, evolving a few bubbles of oxygen over a period of hours from the decomposition of the hydrogen peroxide. Decomposition was accelerated, as desired, in the presence of metallic iron, nickel, cobalt, and copper. Decomposition was also accelerated in the presence of other heavy metals, alkalis, and various catalytic materials extraneous to the present invention, and in contact with roughened surfaces such as etched glass.

DESCRIPTION OF THE PREFERRED EMBODIMENT

In a preferred embodiment of the present invention, magnesium is selected as the anode material, pressed amorphous carbon as the cathode, and an aqueous solu-

| Example number | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Electrolyte (mole per liter, aqueous): | | | | | | | | | | | | | | | | | | | | |
| HCl | 2.5 | 2.5 | 1.54 | 2.6 | 3.9 | 3.0 | 3.0 | 3.8 | 3.0 | 3.42 | 3.75 | | | | | | | 4.0 | 4.0 | 4.0 |
| H$_2$SO$_4$ | | | | | | | | | | | | 2.0 | 2.0 | 2.0 | 2.0 | 1.5 | | | | |
| CH$_3$COOH | | | | | | | | | | | | 2.3 | | | | | | | | |
| H$_2$O$_2$ | 0.45 | 0.45 | 0.57 | 0.87 | 0.39 | 0.67 | 0.67 | 0.76 | 0.67 | 0.71 | 0.75 | 0.9 | 0.9 | 0.9 | 1.2 | 0.9 | 0.9 | 0.63 | 0.63 | 0.63 |
| CH$_3$OH | | 12.3 | | | | | | | | | | | | | | | | | | |
| C$_2$H$_5$OH | 8.5 | | 9.8 | 5.5 | 5.5 | | | | | | | | | | | | | | | |
| NaCl | | | | | | | | | | | | 5.0 | | | 6.0 | | 6.0 | | | |
| CaCl$_2$ | | 0.36 | | | 1.55 | 1.55 | 0.93 | 1.55 | 1.22 | 0.97 | | | | | | | | 1.16 | 1.16 | 1.16 |
| MgCl$_2$ | | | 0.2 | 0.25 | | | | | | | | | | | | | | | | |
| CuCl$_2$ | 0.04 | 0.04 | 0.04 | 0.04 | 0.04 | 0.04 | | 0.04 | | | 0.04 | Trace | | 0.02 | 0.01 | 0.01 | | | | 0.02 |
| FeCl$_3$ | | | | | | | 0.04 | 0.04 | | 0.04 | 0.04 | Trace | | 0.02 | 0.25 | 0.25 | | | 0.02 | 0.02 |
| NiCl$_2$ | | | | | | | | | 0.04 | 0.04 | 0.04 | | | | | | | | | |
| CuSO$_4$ | | | | | | | | | | | | | 0.02 | 0.02 | | | | | | |
| Anode (watt/cm.$^2$): | | | | | | | | | | | | | | | | | | | | |
| Ca | 0.66 | 1.02 | | | 1.78 | 2.02 | 2.48 | 2.48 | 2.48 | 2.6 | | | | | | | | 1.39 | 1.58 | .48 |
| Mg | | | 1.24 | 1.55 | 1.86 | 0.88 | 1.39 | 1.39 | 1.39 | 1.39 | 1.49 | 0.58 | 0.35 | 0.62 | 1.39 | 0.96 | 1.48 | 0.35 | 0.89 | 1.58 |
| Al | | | | | 0.50 | 0.50 | 0.62 | 0.45 | 0.68 | 0.68 | | | | 0.49 | | | | 0.02 | 0.40 | 0.62 |
| Zn | | | | | 0.50 | 0.62 | 0.68 | 0.62 | 0.62 | 0.62 | | | | 0.49 | | | | 0.15 | 0.49 | 0.62 |

EXAMPLE No. 21

In the presence of 0.01 mole per liter of a mixture of iron and copper chlorides, in a 4N hydrochloric acid solution with electrodes of magnesium and carbon, a power density of only 0.02 w./cm.$^2$ was observed before the slow addition of hydrogen peroxide. The effect of very slight concentrations of hydrogen peroxide was to produce surges of increased power density which quickly decreased unless the electrolyte was circulated. However, with adequate circulation, 0.05 mole per liter hydrogen peroxide increased the power density to 0.3 w./cm.$^2$. With only the circulation produced by the reaction, 0.2 mole per liter hydrogen peroxide yielded a sustained power density of 1 w./cm.$^2$.

Interpretation of the foregoing examples shows that anode power density with acid peroxide electrolytes is distinctly improved by heavy metal catalysts; that a hydrogen ion concentration at least corresponding to that of dilute acetic acid, or a pH less than 3.0, is required to achieve a power density with those catalysts as great as that reached by stronger acids without catalysts; and that an adequate source of halide ions is desirable even tion containing, moles per liter, about 4 hydrochloric acid, about 0.6 hydrogen peroxide, about 0.02 cupric chloride, about 0.02 ferric chloride, and about 1.2 magnesium chloride or calcium chloride as the electrolyte. A spacing of about 2 mm. between the anode and the cathode has been found effective, but this spacing is not critical because of the low resistance of the electrolyte. It is desirable to have the cathode surround the anode. If the anode is in the form of a single flat plate of magnesium, the cathode may consist of two carbon plates, one on either side of the anode. If the anode is a magnesium bar progressively fed into the cell, the cathode may take the form of a cup perforated at the bottom for the introduction of electrolyte and permitting the overflow of spent fluid from the top. The anode may then be fed by gravity against a highly porous separator inside this cup. A high current cell having multiple anode plates and multiple cathode plates disposed alternately may be constructed for the present invention in the manner of the Lucas cell, Pat. No. 2,706,213.

The present invention can be employed in fuel cells and batteries and in reserve cells and batteries of various arrangement. Figures depicting examples would be unnecessarily limiting and would tend to deemphasize the actual invention, which is an electrochemical system. The electrolyte supply system and container may be made from an inert nonconductive material such as polysulfone resin, or the reaction container may be made from a chemically inert but electrically conductive material such as graphite or amorphous carbon and serve as the cathode of the cell. The consumable anode may be dipped into the electrolyte to a depth which will determine the output of the cell, or the electrolyte may be fed at a controlled rate between the electrodes. With means already well developed in the art, as exemplified by Pat. No. 2,706,213, for continuously feeding electrolyte and for the discharge of products of reaction, many configurations of highly efficient fuel cells may be constructed without the usual expense of membranes, catalysts, and complex structures.

Although the electrochemical system of the preferred embodiment is effective and permits diverse physical arrangements, it is emphasized that it is not desired to restrict this invention to these materials, because other anode metals, such as lithium, calcium, aluminum, zinc, and alloys containing these and other electropositive metals including sodium, can be used with other cathode materials, such as iron, copper, molybdenum, and tungsten, and with other electrolytes, such as sulfuric acid solutions of peroxyacetic acid with nickel chloride and sodium chloride.

For cells having anodes of metals which produce soluble sulfates, sulfuric acid and the hydrogen peroxide may be introduced simultaneously by the hydrolysis of peroxydisulfuric acid:

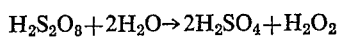

$$H_2S_2O_8 + 2H_2O \rightarrow 2H_2SO_4 + H_2O_2$$

For use with an electrolyte containing primarily hydrochloric acid, an anode composed of an alloy containing about 2 parts magnesium to 5 parts calcium is resistant to atmospheric corrosion and produces nearly the same power density as a pure calcium anode.

The outstanding electrochemical ranking of lithium and its chemical similarity to the alkaline earth metals justify its inclusion as an anode metal for the present invention for applications where its cost can be justified.

Catalytic ions may be introduced into the electrolyte in any of several ways, including the direct solution of iron, nickel, cobalt, or copper chloride; by the reaction of the catalytic metal with hydrochloric acid containing hydrogen peroxide; by the solution of copper oxychloride; or by the solution of any other compound which liberates the desired metal ions and which does not contain an objectionable radical. Catalytic ions may be withheld from the electrolyte until the time of activation of the cell, as by separately adding a salt to the electrolyte upon activation, by providing a soluble source of the metal within the electrolyte container, or by preparing the anode, or less desirably the cathode, with a coating of the catalytic metal or compound. For limited applications, the cathode may be made from one or more of the catalytic metals. It will receive some electrolytic protection because of the direction of current flow, but it will inevitably furnish some ions to the electrolyte.

Hydrogen peroxide may be introduced directly or by the hydrolysis of an inorganic or organic peroxide or of a peroxyacid. The peroxides of the alkali and alkaline earth metals, peroxydisulfuric acid, and peroxyacetic acid are typical sources of hydrogen peroxide by hydrolysis. Hydrolysis of calcium peroxide in hydrochloric acid furnishes a desirable calcium chloride concentration to moderate the cell reaction and at the same time to introduce the peroxide in a stable, dry form.

In the practice of the present invention it is desirable to limit the introduction of radicals and organic groups to those specifically functional in the electrically productive reaction, or, as with the primary alcohols, in its suppression to a desired level. Peroxyacetic acid was found to produce a foam between the electrodes which mechanically impeded the reaction. Others of the numerous organic peroxides, some of which are known to be explosive, would present hazards as well as functional disadvantages. The selection of unfamiliar peroxides should not be made by unskilled experimentation.

The effluent electrolyte may be restored to condition for recirculation through the cell by the addition of an acid and a peroxide. The heavy metal salts may be repeatedly recirculated. In an energy economy providing for the repeated electrolysis of light metal compounds to provide anodic fuels, none of the fuel constituents involved in the present invention need be wasted.

While I have described a preferred form of the invention, it is apparent that the invention is capable of variation and modification from that form so that the scope of the invention should be limited only by the proper scope of the claims appended hereto.

What I claim is:

1. An electrochemical cell having an anode formed from a metal selected from the class consisting of lithium, calcium, magnesium, zinc, aluminum, and their alloys; a relatively inert cathode spaced from the anode; and an electrolyte which comprises between the anode and the cathode
    (a) a polar solvent selected from the class consisting of water, the primary alcohols, and mixtures thereof
    (b) an acid
    (c) hydrogen peroxide
    (d) a salt selected from the class consisting of the salts of iron, cobalt, nickel, and copper, and mixtures thereof.

2. A cell according to Claim 1 wherein the electrolyte comprises a polar solvent selected from the class consisting of water, the primary alcohols, and mixtures thereof and in the space between the anode and the cathode has a pH value less than 3.0 and contains in solution at least 0.05 mole hydrogen peroxide and at least 0.01 gram equivalent of a salt selected from the class consisting of iron, cobalt, nickel, and copper salts and mixtures thereof per liter of electrolyte.

3. A cell according to Claim 2 wherein the electrolyte contains from about 0.01 to about 6.0 gram equivalent of a salt selected from the group consisting of the salts of lithium, sodium, calcium, magnesium, zinc, and aluminum per liter of electrolyte.

4. A cell according to Claim 1 wherein the electrolyte is a solution which between the anode and the cathode comprises a solvent from the class consisting of water, the primary alcohols, and mixtures thereof; from about 0.05 to about 5.0 moles hydrogen peroxide per liter of electrolyte; at least 0.01 gram equivalent of a salt selected from the class consisting of iron, cobalt, nickel, and copper salts and mixtures thereof per liter of electrolyte, and has a pH value less than 3.0.

5. A cell according to Claim 1 wherein the electrolyte is a solution which between the anode and the cathode comprises a solvent from the class consisting of water, the primary alcohols, and mixtures thereof; from about 0.1 to about 5.0 moles hydrogen peroxide per liter of electrolyte; at least 0.02 gram equivalent of a salt selected from the class consisting of iron, cobalt, nickel, and copper salts per liter of electrolyte; and has a pH value less than 3.0.

6. A cell according to Claim 1 wherein the electrolyte is an aqueous solution comprising from about 0.1 to about 10 moles hydrogen halide per liter of electrolyte; from about 0.05 to about 5.0 moles hydrogen peroxide per liter of electrolyte; and from about 0.01 to about 2.5 gram equivalent of a halide selected from the group consisting of iron, cobalt, nickel, and copper halides and mixtures thereof per liter of electrolyte.

7. A cell according to Claim 1 wherein the electrolyte is an aqueous solution comprising from about 0.05 to about 5 moles sulfuric acid per liter of electrolyte; from about 0.05 to about 5.0 moles hydrogen peroxide per liter of electrolyte; and from about 0.01 to about 2.5 gram equivalent of a salt selected from the group consisting of iron, cobalt, nickel, and copper salts and mixtures thereof per liter of electrolyte.

8. The method of producing high power density electrochemically which comprises bringing into electrolytic contact with a consumable metal anode and a relatively inert cathode an aqueous electrolyte having a pH value less than 3.0 comprising hydrogen peroxide and a catalyst; said catalyst comprising a salt selected from the group consisting of the salts of iron, cobalt, nickel, and copper, and mixtures thereof.

9. The method of Claim 8 wherein the anode metal is selected from the group comprising lithium, calcium, magnesium, zinc, aluminum, and their alloys.

10. The method of Claim 8 wherein the hydrogen peroxide is introduced by the hydrolysis of a peroxide selected from the class comprising the inorganic peroxides, the organic peroxides, and the peroxyacids.

11. The method of Claim 8 wherein the hydrogen peroxide is introduced by the hydrolysis of a metal peroxide.

12. The method of Claim 8 wherein the hydrogen peroxide is introduced by the hydrolysis of a compound selected from the class consisting of peroxymonosulfuric acid and its salts, peroxydisulfuric acid and its salts, peroxymonophosphoric acid and its salts, peroxydiphosphoric acid and its salts, and the peroxyborates.

13. The method of producing high power density electrochemically which comprises bringing into electrolytic contact with a consumable metal anode selected from the class consisting of lithium, calcium, magnesium, zinc, aluminum, and their alloys and a relatively inert cathode an electrolyte having a pH value less than 3.0 and comprising a polar solvent selected from the class consisting of water, the primary alcohols, and mixtures thereof wherein is dissolved from 0.05 to 5.0 moles hydrogen peroxide per liter of electrolyte and from 0.01 to 2.5 gram equivalent of a salt selected from the group consisting of iron, cobalt, nickel, and copper salts per liter of electrolyte.

14. The method of producing a high power density electrochemically which comprises bringing into electrolytic contact with a consumable metal anode selected from the class comprising magnesium, calcium, and their alloys an electrolyte comprising water as the principal solvent, wherein is dissolved about 4 moles hydrochloric acid per liter of electrolyte, about 0.6 mole hydrogen peroxide per liter of electrolyte; about 1.2 moles salts selected from the group consisting of the chlorides of sodium, calcium, and magnesium per liter of electrolyte; and about 0.04 mole of a salt selected from ferric and cupric chlorides and mixtures thereof per liter of electrolyte.

References Cited

UNITED STATES PATENTS

| | | | |
|---|---|---|---|
| 2,706,213 | 4/1955 | Lucas | 136—154 X |
| 3,330,701 | 7/1967 | McElhill et al. | 136—137 |
| 3,446,671 | 5/1969 | Kring | 136—86 A |

ANTHONY SKAPARS, Primary Examiner

U.S. Cl. X.R.

136—86 A, 154

UNITED STATES PATENT OFFICE
CERTIFICATE OF CORRECTION

Patent No. 3,825,445                     Dated July 23, 1974

Inventor(s)   Richard W. MacCarthy

It is certified that error appears in the above-identified patent and that said Letters Patent are hereby corrected as shown below:

Columns 5 and 6, Table of Examples now reads:

Example number ----            20

Anode (Watt/cm.$^2$):
    Ca--------------               .48

The value ".48" should read -- 2.48 --.

Signed and sealed this 5th day of November 1974.

(SEAL)
Attest:

McCOY M. GIBSON JR.                C. MARSHALL DANN
Attesting Officer                  Commissioner of Patents